Dec. 22, 1959   H. P. KALMUS ET AL   2,918,583
APPARATUS FOR MEASURING RADIANT ENERGY AT VERY LOW LEVELS
Filed May 4, 1955   2 Sheets-Sheet 2
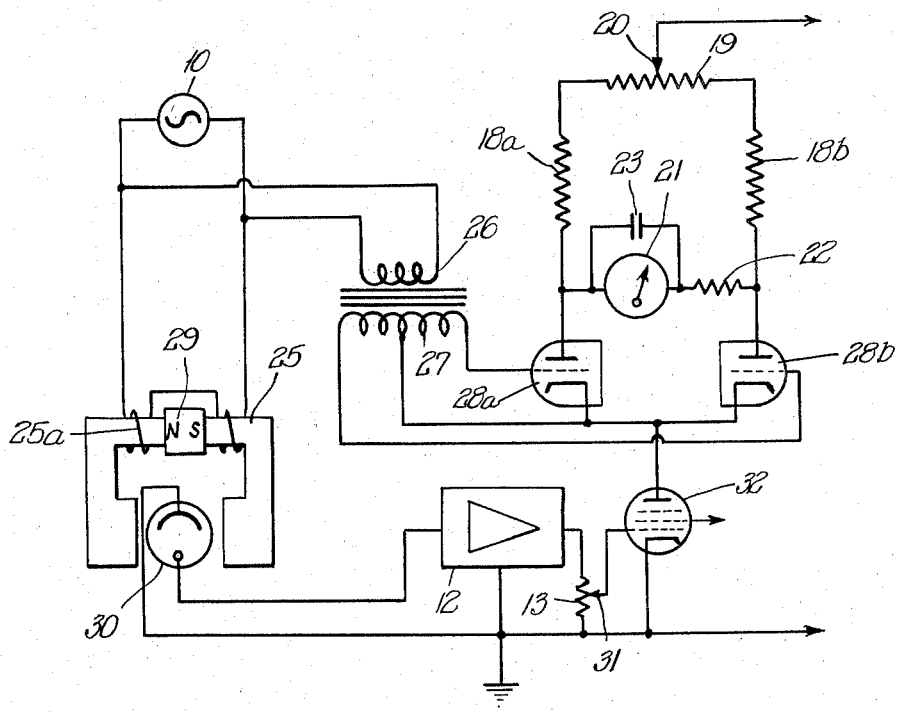
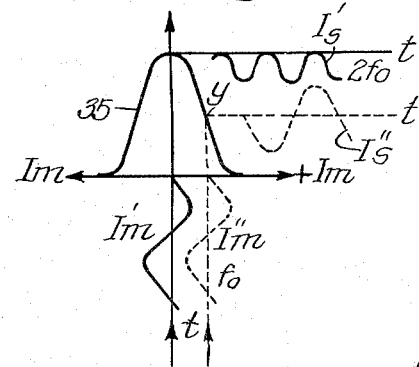
INVENTORS
Henry P. Kalmus,
BY Lawrence C. Kelsey,

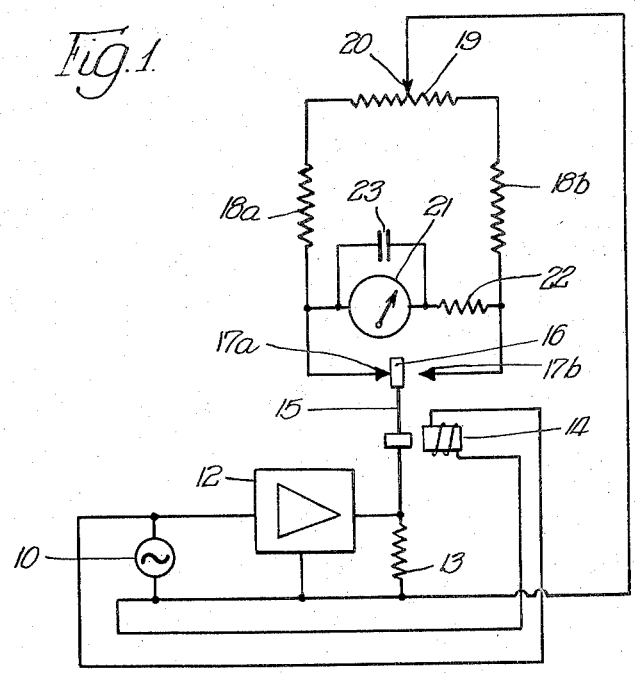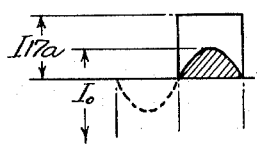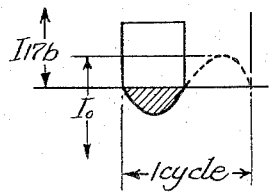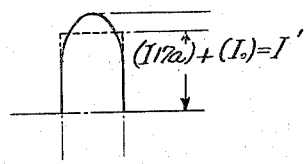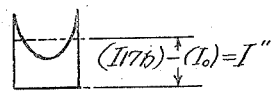

United States Patent Office 2,918,583
Patented Dec. 22, 1959

2,918,583

APPARATUS FOR MEASURING RADIANT ENERGY AT VERY LOW LEVELS

Henry P. Kalmus, Washington, D.C., and Lawrence C. Kelsey, Chicago, Ill., assignors to W. M. Welch Manufacturing Company, Chicago, Ill., a corporation of Illinois Application May 4, 1955, Serial No. 505,877

5 Claims. (Cl. 200—214)

The present invention relates to improvements in apparatus for the detection and measurement of very low strength signal potentials, such as are involved in the operation of photoelectric units. A specific example, to which the improved circuit of the invention has primary and perhaps best application is the instrument known as a densitometer which is widely employed in laboratory testing operations, in photographic printing, etc. A principle of electromagnetically modulating a minute phototube voltage for amplification in an A.C. amplifier is involved, and typical circuits of this sort are the subjects matter of U.S. Letters Patent to Kalmus 2,424,933 of July 29, 1947 and Kalmus et al. 2,605,428 of July 29, 1952.

It is the common practice in detection and measuring apparatus of the type described to employ some form of narrow band width circuitry for the purpose of excluding unwanted signals such as noise, hum, microphonics, and the like. Such disturbance is present in all high gain amplifiers, being occasioned by a thermal phenomenon in resistor components, by filament to cathode leakage, by capacitive or inductive pickup from adjacent circuit elements, and the like.

If the detected signal to be measured is a high audiofrequency one or a radio frequency signal, inductive-capacitive circuits are most commonly employed, and they can be built with good linearity by careful design to present a high induction factor. However, in regard to the problem to which the present invention addresses itself, i.e. the detection and measurement of radiant energy at low audio-frequencies, the necessity of using large inductances in an L C system, with resulting core losses, inevitably results in non-linearity of the detected and amplified signal.

Accordingly, it is customary to use resistance-capacity networks in low audio-frequency measurement because of their good linearity, as well as their economy of components. Examples are the well known Parallel-T or Twin-T network and the Bridge-T network. In the case of the former a very high ratio of wanted signal to unwanted signal can be had if the components of the Parallel-T are properly selected and if the circuit is used as a feed-back network in a high gain stage. The Bridge-T network lacks the high rejection characteristic of the Parallel or Twin-T and does not reach a sharp null at the center frequency. When used for feed-back with a high gain amplifier it reduces the gain of the stage considerably by feed-back of desired frequency. The resistance capacity hookups are objectionable in that they produce amplitude variation when the signal to which they are tuned shifts in frequency. Hence, in order to obtain a high rejection characteristic which most recommends them, particularly in the case of the Parallel-T, the frequency of the incoming signal potential must be very closely controlled. This can be done, but at a considerable loss in the economy of design which is an important feature of advantage of the resistance capacity hookup.

In the earlier development of magnetically modulated radiant energy detecting and amplifying circuits as disclosed in the Kalmus patents identified above, when using a normal 60 cycle line voltage supply it was found to be advantageous to excite the magnetic modulating field at half the frequency of the signal as developed in the subsequent amplification stage, in order to avoid severe shielding problems. Accordingly, the amplifier was tuned to 120 cycles in order that the magnetic field modulating a photoelectric signal at the usual 60 cycles per minute of the line supply should not produce too much interference.

In order to avoid the need to maintain this closely controlled frequency relationship which is inherent in a resistance capacity network operated on line voltage, as well as to avoid the additional expense of separate excitation provisions in the respective magnetic modulation and detection stages, and because the use of an inductance capacitance circuit is not practical at low audio-frequency operation, the present apparatus follows another principle, which is termed synchronous rectification or synchronous detection, and which has important advantages in the measurement of signal potentials of very low level at a specific frequency.

In following this principle the invention has as its object the alternate combination of half cycles of an electromagnetically modulated, sinusoidal signal current with square reference waves of exactly the same frequency and phase relationship, with the result that a difference current is derived which is directly proportional to the amplitude of the signal, and is ideally suited to the metering thereof.

Specifically, it is a requirement of such a system of synchronous rectification that the electromagnetic modulating source for a phototube which originally detects the incoming low potential signal and the source of excitation of the square wave reference voltage shall be the same, as the same generator. The two voltages will then remain in perfect synchronism regardless of any possible frequency shifts. In this respect the present invention involves a still further refinement of the known synchronous rectification network, particularly in a photoelectric measuring system, in that it superimposes a fundamental excitation or square wave reference frequency and an electromagnetically modulated phototube signal frequency which are in perfect phase, being excited from a common source, and in that the modulation for the phototube signal has combined therewith an additional component of steady, permanent magnet phototube bias. The combined application of such a steady bias with an alternating magnetic field bias has been found to substantially improve the phototube output signal potential. This is possible because of the higher root mean square value of the resultant waveform.

The invention also involves the use of a filter in the meter circuit which short circuits or attenuates high frequency impulses, thus obtaining electrical damping of the meter. The result is a balanced and stable synchronous rectifier for the measurement of low level and low frequency signals which is substantially unresponsive to random disturbance pulses.

Viewed generally, it is the objective of the invention to afford a method and system which perfect the synchronous detection principle in such a way that its advantages are available under all conditions of operation, particularly at low signal level, not simply under ideal operating conditions at which the ordinary synchronous detector circuit is entirely satisfactory, for when the desired signal potential is of very low strength it is then necessary to contend with "noise" signals which often exceed the true signal in amplitude. Since, in accordance with the invention as outlined above, the circuit responds to indicator and reference signals which are invariably of the same frequency, the disturbance will balance out, the average noise being the same for either of successive square wave pulses of the detector.

The same result occurs when other steady state frequencies are present. Large random pulses do not balance out when they occur during the period of a square wave pulse. However, these unwanted signals are damped out by electrical filtering action in the meter circuit or mechanically, due to the inertia of the meter pointer, or by both means.

The foregoing statements are indicative in a general way of the nature of the invention. Other and more specific objects will be apparent to those skilled in the art upon a full understanding of the composition and operation of the system.

A single embodiment of the invention is presented herein for purpose of illustration. It will be appreciated that the invention may be incorporated in other modified forms coming equally within the scope of the appended claims.

In the drawings:

Fig. 1 is a schematic diagram illustrating a simplified hypothetical circuit incorporating certain electromechanical provisions as a means of explaining the principle and operation of the improved method and system;

Figs. 2A through 2D are graphs illustrating instantaneous relationships and additive effects produced by the superimposition of indicator signal and reference currents involved in the operation of the hypothetical circuit of Fig. 1, as well as in a practical circuit according to the improvement;

Fig. 3 is a schematic wiring diagram illustrating the application of the principle of synchronous detection in such a practical, low level radiant energy measuring circuit; and Fig. 4 is a graph showing the effect of the combination of a fixed field and an alternating field on photo or space current, which effect is utilized in the system shown in Fig. 3.

First referring to the hypothetical electromechanical installation appearing in Fig. 1, the reference numeral 10 designates a suitable alternating signal generator which will supply a signal potential to an alternating current amplifier 12 of conventional design, the amplified output of this unit being fed into a resistor 13. The same alternator 10 supplies current to the coil of a solenoid 14, which drives a switch 15 having a contact 16 which alternately engages fixed contacts 17a, 17b at the frequency of excitation of the solenoid. Switch member 15 is thus in synchronism in its movements with the frequency of the output signal current at resistor 13.

When contact 16 engages contact 17a a pulse having a square wave characteristic is forwarded through a circuit associated with fixed contact 17a; the same occurs when switch member 16 engages the other fixed contact 17b. This circuit includes series-connected load and balancing resistors 18a, 18b and 19, to the last named of which the output of amplifier 12 is connected by a tap 20. A meter 21 is connected in parallel with the resistors in a damping filter circuit comprising resistor 22 and capacitor 23. The total current flowing in any instance when switch contact 16 is in engagement with contact 17a or 17b is thus the combination, I', of a current $I_0$ through resistor 13 (Figs. 2A–2D) and a square wave current, designated $I_{17a}$ or $I_{17b}$, for the appropriate square wave forwarding period.

Fig. 2A illustrates the instantaneous relation of the two currents, while Fig. 2C shows the sum of the two currents when flowing through contact 17a. Fig. 2B depicts the instantaneous relationship and Fig. 2D shows the subtractive superimposition, I", of the two currents when contact 16 engages fixed contact 17b. An average will be represented by one half the sum of currents I' and I", while the value I' minus I" will be a difference current on which the operation of present system depends.

It is the purpose of the damping components 22, 23 of the meter circuit to determine the time constant of the meter and the ultimate band width of the circuit.

Resistors 18a, 18b are load resistors, and their relationship to resistor 19 is such that the current flowing in the circuit of each switch contact 17a, 17b will be equal when the tap 20 is set at the exact electrical midpoint of resistor 19. No signal current is then present in resistor 13 and no difference current, as identified above, will flow through meter 21. However, when a signal is present as described above a difference current will be present in the meter and damping filter circuit, the meter then indicating the magnitude of the difference.

Turning now to Fig. 3 of the drawings, the basic circuit of Fig. 1 is there represented in a practical form wherein the improvements according to the invention are combined. Because of similarities of these two circuits in certain general respects, corresponding reference numerals will be employed to designate corresponding components or relationships.

The generator 10 is in this instance shown as connected to the coil of an electromagnet 25. It also supplies the primary winding of a transformer 26, the secondary 27 of which drives the grids of two triodes 28a, 28b. These grids are alternately driven to cutoff by the stepped up voltage of transformer 26, hence act as a single pole, double throw switch similar in function to the switch 15 of Fig. 1.

A permanent magnet 29 is associated with electromagnet 25 including an excitation coil 25a and the latter is in a physical relationship to a phototube 30 such that the space current in the phototube, resulting from incident flux falling on its cathode, is periodically interrupted, thereby modulating the phototube current for subsequent alternating current amplification in the amplifier 12, to which the output of the phototube is connected. The frequency of the modulated current equals the frequency of the modulating source 10, hence the frequency of the current applied to tubes 28a, 28b by transformer 10, supplied by the same source. The modulated phototube or indicator signal voltage appears amplified across a resistor 13, which is connected by a tap 31 with the grid of a conventional pentode 32. Pentode 32 is in cascade arrangement with the triodes 28a, 28b.

The meter 21, resistor 22 and capacitor 23 are the exact counterparts, as are the load resistors 18a, 18b and balancing resistor 19, of the respective elements illustrated in Fig. 1, and they perform the same functions.

Fig. 4 shows the relation of the original alternating current $I_m$ in coil 25a to the resulting periodic variations in space current $I_s$. The magnetization curve 35 represents the value of $I_s$ as a function of positive and negative values of $I_m$. $I'_m$ and $I''_m$ symbolize two variations in the magnetizing current, i.e. lacking and supplied with a fixed field, respectively. The correlated space current curves, labeled $I'_s$ and $I''_s$ are derived in a known manner from magnetization curve 35. As shown in Fig. 4, in the absence of the fixed field component essentially twice the fundamental frequency, $f_o$, space current $I'_s$ is obtained. In the presence of a fixed field component the curve $I'_s$ is shifted to the operating point $g$ on the magnetization curve 35 as indicated in curve $I''_s$.

Figs. 2A and 2B show ideal conditions for synchronous detection. However, as pointed out above, this is not the case when a desired signal is set up at a very low level. We now have to contend with "noise signals" which often exceed the signal potential in amplitude. Since the synchronous detector responds to signals of the same frequency, "noise signals" will balance out inasmuch as the average noise will be the same for either square wave pulse of the detector. The same result occurs when other steady state frequencies are present.

Large random pulses do not balance out when they occur during the period of one square wave pulse. However, the meter response is controlled by the mechanical inertia of the meter pointer, as well as by the electric filter in the meter circuit. If the full scale meter response is one second, the apparent circuit bandwidth is one cycle per second. This means the meter would not respond to beat frequencies between the fundamental frequency and unwanted signal potentials of more than one cycle per second.

It is possible by a system of the sort described to measure tiny in-phase signal potentials across meter 21 and yet exclude large out-of-phase unwanted potentials, though synchronous, since a 90° shift in phase will result in no difference current traversing the meter even though the out-of-phase unwanted signal may be of greater magnitude than the desired in-phase signal.

We claim:

1. A system for detecting and measuring radiant energy input signals at low potential levels, comprising a photosensitive unit receiving such a signal and acting to originate an electron stream and resultant signal output current, means creating a magnetic field of alternating character, said means acting to bias said stream and modulate said output current in a sinusoidal wave form and at predetermined frequency, a device producing a pulsating reference current of square wave character, a common source of energization for said modulating means and device, being operatively connected to the same whereby said reference and output currents have identical phasing and frequency, means to superimpose said reference and output currents and thus produce a difference current reflecting the amplitude of said input signal, means for measuring said difference current including a meter connected to be responsive thereto having damping filter circuit means associated therewith to minimize the application thereto of random disturbance pulses, and balancing circuit means connected across said measuring means whereby the effects of said reference and output currents on said meter are balanced out and said meter is responsive substantially only to the difference therebetween on application of an input signal.

2. A system for detecting and measuring radiant energy input signals at low potential levels, comprising a photosensitive unit receiving such a signal and acting to originate an electron stream and resultant signal output current, means comprising electromagnetic and permanent magnetic devices creating a combined magnetic field of alternating character, said means acting to bias said stream and modulate said output current in a sinusoidal wave form and at predetermined frequency, a device producing a pulsating reference current of square wave character, a common source of energization for said modulating means and device, being operatively connected to the same whereby said reference and output currents have identical phasing and frequency, means to superimpose said reference and output currents and thus produce a difference current reflecting the amplitude of said input signal, means for measuring said difference current including a meter connected to be responsive thereto having damping filter circuit means associated therewith comprising a shunt capacitor and a series resistor to limit the signal applied to said meter substantially only to said difference current, and balancing resistance means connected across said measuring means and to said common source whereby said meter is responsive substantially only to said difference current varying substantially only as a function of an input signal.

3. A system for detecting and measuring radiant energy input signals at low potential levels, comprising a photosensitive unit receiving such a signal and acting to originate an electron stream and resultant signal output current, means comprising electromagnetic and permanent magnetic devices creating a combined magnetic field of alternating character, said means acting to bias said stream and modulate said output current in a sinusoidal wave form and at predetermined frequency, a device producing a pulsating reference current of square wave character, a common source of energization for said modulating means and device, being operatively connected to the same whereby said reference and output currents have identical phasing and frequency, means to superimpose said reference and output currents and thus produce a difference current reflecting the amplitude of said input signal, a measuring device receiving said difference current and indicating its value at the phasing and frequency of said common source, means for reducing the application of random disturbance pulses to said measuring device including a shunt capacitor and a series resistor and a resistor in shunt with said capacitor and series resistor, and means variably connecting said shunt resistor to said common source to adjust said meter for response substantially only to said difference current varying as a function of an input signal.

4. A system for detecting and measuring radiant energy input signals at low potential levels, comprising a photosensitive unit receiving such a signal and acting to originate an electron stream and resultant signal output current; means creating a magnetic field of alternating character including a magnetic field structure, a winding thereon, and a permanent magnet in said magnetic field structure; said magnetic field structure acting to bias said stream and modulate said output current in a sinusoidal wave form and at predetermined frequency, a device producing a pulsating reference current of square wave character, a common alternating current source of energization for said winding and device being operatively connected to the same whereby said reference and output currents have identical phasing and frequency, and means to superimpose said reference and output currents and thus produce a difference current reflecting the amplitude of said input signal.

5. A system for detecting and measuring radiant energy input signals at low potential levels, comprising a photosensitive unit receiving such a signal and acting to originate an electron stream and resultant signal output current; means creating a magnetic field of alternating character including a magnetic field structure, a winding thereon, and a permanent magnet in said magnetic field structure; said magnetic field structure acting to bias said stream and modulate said output current in a sinusoidal wave form and at predetermined frequency, a device producing a pulsating reference current of square wave character, a common alternating current source of energization for said winding and device being operatively connected to the same whereby said reference and output currents have identical phasing and frequency, means to superimpose said reference and output currents and thus produce a difference current reflecting the amplitude of said input signal, means for measuring said difference current including a meter connected to be responsive thereto having damping filter circuit means associated therewith to minimize application thereto of random disturbance pulses, and balancing circuit means connected across said measuring means whereby the effects of said reference and output currents on said meter are balanced out and said meter is responsive substantially only to the difference therebetween on application of an input signal.

References Cited in the file of this patent
UNITED STATES PATENTS

| | | |
|---|---|---|
| 2,323,966 | Artzt | July 13, 1943 |
| 2,424,933 | Kalmus | July 29, 1947 |
| 2,605,428 | Kalmus et al. | July 29, 1952 |
| 2,801,342 | Jones | July 30, 1957 |